United States Patent [19]
Weeks et al.

[11] Patent Number: 5,227,606
[45] Date of Patent: Jul. 13, 1993

[54] METHOD AND APPARATUS FOR LASER CUTTING OF MULTIPLE STACKED METAL WORKSHEETS

[75] Inventors: Theodore R. Weeks, Canandaigua, N.Y.; Robert R. Lopez, Norwalk, Calif.; John J. Burgardt, Santa Ana, Calif.; Donald J. Hoffman, Laguna Niguel, Calif.

[73] Assignee: U.S. Amada Ltd., Buena Park, Calif.

[21] Appl. No.: 841,547

[22] Filed: Feb. 26, 1992

[51] Int. Cl.$^5$ .............................................. B27K 26/14
[52] U.S. Cl. ...................... 219/121.67; 219/121.72; 219/121.82; 219/121.84
[58] Field of Search ................... 214/121.67, 121.72, 214/121.82, 121.84

[56] References Cited

U.S. PATENT DOCUMENTS

| | | | |
|---|---|---|---|
| 4,063,059 | 12/1977 | Brolund et al. | 219/68 |
| 4,106,183 | 8/1978 | Brolund et al. | 29/564 |
| 4,165,667 | 8/1979 | Brolund et al. | 83/409 |
| 4,353,537 | 10/1982 | Koufos | 269/266 |
| 4,399,988 | 8/1983 | DeShong | 269/8 |
| 4,458,133 | 7/1984 | Macken | 219/121.63 |
| 4,532,839 | 8/1985 | Easton | 83/29 |
| 4,602,541 | 7/1986 | Benzinger et al. | 83/36 |
| 4,789,770 | 12/1988 | Kasner et al. | 219/121.7 |

OTHER PUBLICATIONS

Amada Publication entitled "Amada Laser Systems".

*Primary Examiner*—C. L. Albritton
*Attorney, Agent, or Firm*—Wigman, Cohen, Leitner & Myers

[57] ABSTRACT

A method and apparatus for laser cutting of multiple stacked metal worksheets is disclosed wherein the tendency of the sheets to separate during the cutting operation is restrained. In one embodiment the laser head is pressed downwardly against the stacked worksheets which are supported on a ball-transfer work table. In other embodiments where it is not possible to press the laser head against the stacked worksheets because of the construction of the work table, the worksheets are coated with a viscous fluid so as to increase surface tension effects and thereby generate adhesive forces between adjacent sheets sufficient to resist the pressure of cutting assist gases which would otherwise cause separation of the sheets.

10 Claims, 3 Drawing Sheets

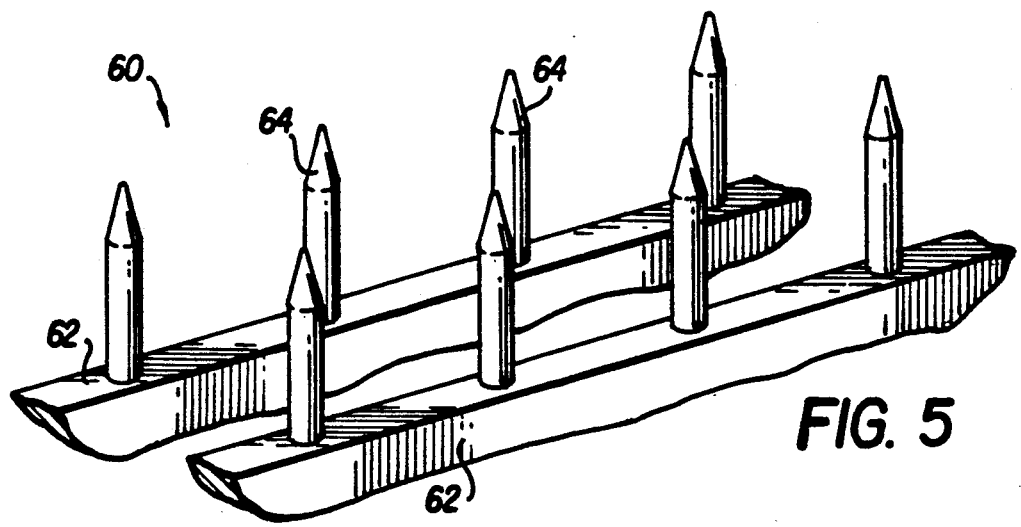
FIG. 5
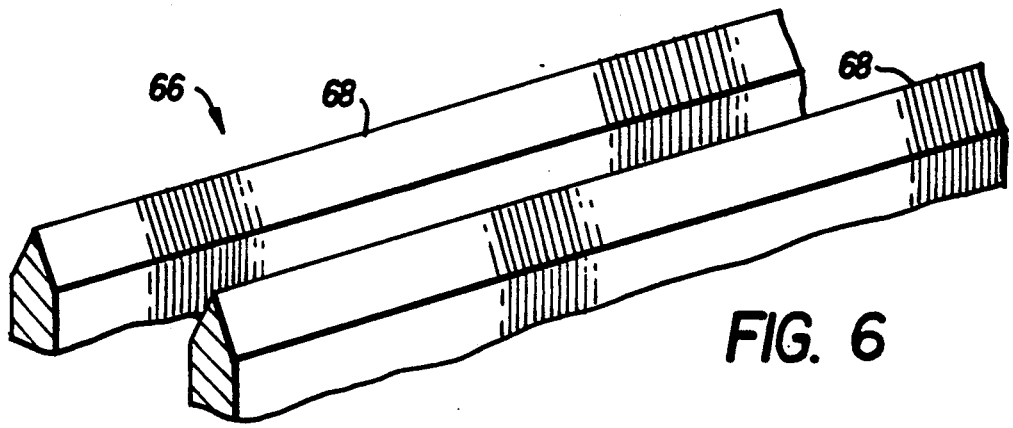
FIG. 6
FIG. 7
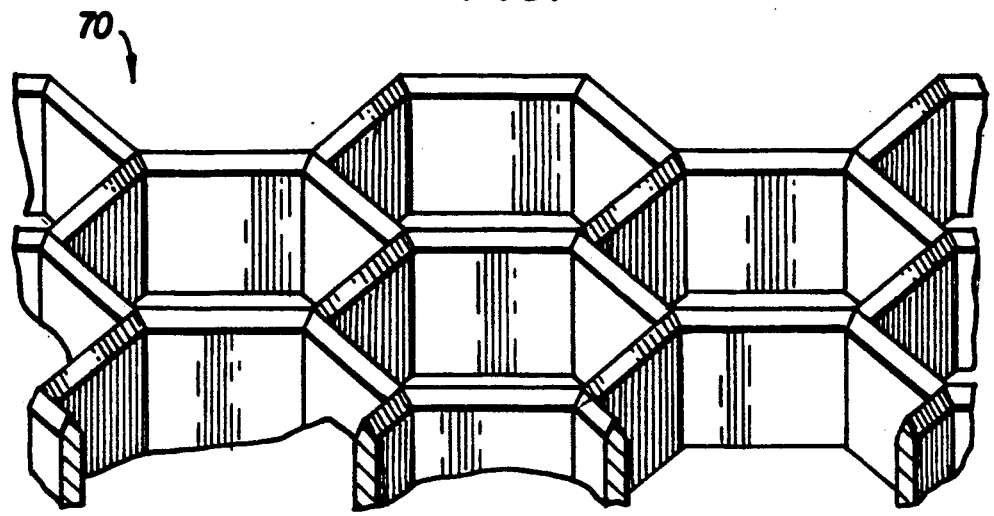

METHOD AND APPARATUS FOR LASER CUTTING OF MULTIPLE STACKED METAL WORKSHEETS

BACKGROUND OF THE INVENTION

This invention relates generally to laser cutting machines, and more particularly to laser cutting of multiple stacked worksheets.

Laser cutting machines using a focused $CO_2$ laser beam to cut through a metal worksheet are well known in the art. Such machines are typically of fixed beam design wherein the worksheet is moved relative to the beam over a ball-transfer type work table by a carriage having suitable clamps attached to the worksheet along one edge thereof. In other arrangements, the worksheet may be clamped directly on a pin or blade-type work table which, in turn, may be moved in its entirety relative to the laser beam. Computerized numerical control (CNC) systems are conventionally provided to automatically control movement of the worksheet along the X and Y axes, as well to control movement of the laser cutting head along the Z axis toward and away from the worksheet. A suitable exhaust system may also be provided to remove gases and particulate matter generated during cutting.

The laser beam is usually focused at the upper surface of the metal sheet in order to maximize laser cutting efficiency and to achieve the cleanest and most accurate cut. (Under certain circumstances, however, it may be advantageous to focus the laser beam either slightly above or slightly under the surface.) The focused laser beam is in the form of an inverted cone, with its apex being the focal point. Since the power density of the laser beam varies inversely with its diameter, any upward movement of the worksheet into the focused beam would increase the spot diameter of the beam profile on the surface of the sheet, with a corresponding decrease in the power density. This would result in a widening of the kerf and a decrease in the concentrated heat generated. Consequently, less metal would be vaporized and more dross and slag formed.

In order to maintain a constant beam profile or laser spot diameter as the worksheet is moved relative to the beam, a sensing system may be provided which automatically adjusts the position of the laser head along the Z axis in response to irregularities or unevenness in the surface of the worksheet. In some machines the laser head is positioned above the worksheet and a so-called "spoon" sensor carried by the head contacts and rides over the surface of the worksheet. Irregularities or unevenness in the surface of the worksheet which are sensed by the "spoon" sensor are transmitted to the CNC which automatically adjusts the position of the head through a suitable control mechanism in order to maintain the proper focus. In other machines the head itself may be designed to lightly contact the surface of the worksheet by means of roller balls disposed on the underside thereof. In such arrangements, the head is constructed to have a "float" of approximately 0.75 inches so that it can freely move up and down along the Z axis against a spring bias so as to be self-adjusting.

Laser cutting of metal worksheets is typically accomplished in the presence of either reactive gases (exothermic cutting) or inert gases (endothermic cutting) which may be under several hundred PSI pressure. In exothermic cutting the reactive gases (e.g., $O_2$, air) are ignited by the laser beam so as to reach a temperature and pressure sufficient to cut through the metal. In endothermic cutting, on the other hand, the laser beam itself cuts through the metal while the inert gases (e.g., N, He) function to blow out the slag and surround the molten edges of the sheet so as to prevent oxide formation. The latter function is particularly advantageous in so-called "clean cut" operations where it is desired to obtain weld-ready edges, free of oxides and dross, that require no expensive secondary finishing. High velocity cutting nozzles are provided to direct such cutting assist pressurized gases against the worksheet coaxial to the laser beam.

The above-described laser cutting machines have been found effective in cutting single metal worksheets of up to 0.5 inches thickness. However, attempts to cut through two or more stacked worksheets heretofore have not been successful. In such circumstances the pressurized cutting assist gases tend to flow between and separate the sheets, thus causing the top sheet(s) to move upwardly toward the laser head. This phenomenon leads to a number of undesirable results.

It has been determined in accordance with this invention that if the pressure of the cutting assist gases between stacked worksheets causes the top sheet(s) to move upwardly into the laser beam, the kerf width will increase and the cut will tend to be of poor quality with unacceptable amounts of dross formed thereon. Even on machines in which the laser head is automatically adjustable along the Z axis in response to sensed irregularities or unevenness in the surface of the worksheet, a change in the focal point in response to upward movement of the top sheet will necessarily change the distance between the focal point and the lower sheet(s). Such a change would, of course, vary the power density of the laser beam relative to the lower sheet(s), thereby adversely affecting the cut(s) therein. Moreover, if there is any separation of adjacent sheets, slag blown off of the cut through the upper sheet will tend to splatter outwardly over the lower sheet rather than being blown clearly through the cut stack as would occur if there were no separation of the sheets.

In rear-address ball-transfer machines the sheets are clamped at only one edge thereof and moved along the X and Y axes by a carriage located at the rear of the machine. Consequently, the further the cut is removed from the clamped edge, the greater is the tendency of the stacked sheets to separate. The same problem exists in other types of machines, such as pin and blade table machines. Even if the sheets are clamped to the table at more than one edge, the upper sheets may "bow-out" during cutting, particularly near the center regions of larger sheets.

It is, therefore, a primary object of this invention to provide an improved method and apparatus for laser cutting of multiple stacked metal worksheets.

More particularly, it is an object of this invention to provide a method and apparatus for laser cutting of multiple stacked metal worksheets in which pressurized cutting assist gases do not cause the top sheet(s) to move upwardly into the laser beam, thereby adversely affecting the quality of the cut.

Another object of this invention is to provide a method and apparatus for laser cutting of multiple stacked metal worksheets in which the edges of the worksheet are accurately cut and dross formation minimized.

SUMMARY OF THE INVENTION

The foregoing and other objects are accomplished in accordance with this invention by maintaining adjacent sheets in close contacting relationship throughout the cutting process. This is achieved in one embodiment of the invention utilizing a ball-transfer type machine by providing roller balls on the bottom of the cutting head and pressing the head downwardly against the stacked worksheets with sufficient pressure to keep the sheets in close contacting relationship during the cutting process while still allowing the stack to be moved freely relative to the laser beam.

The roller balls on the bottom of the cutting head are arranged in a circular pattern and adapted to cooperate with a corresponding circle of roller balls set in the work table. The stacked worksheets are positioned between and squeezed together by the upper and lower circles of roller balls. Although the laser head may still have some "float" in order to accommodate gross irregularities or unevenness in the surface of the upper sheet, the pressure exerted by the laser head against the stacked sheets is such that most, if not all, of the "float" in the head is taken out. Preferably, the "float" will be less than 0.25 inches.

In other types of laser cutting machines having movable pin, blade or honeycomb support tables, the stacked worksheets are usually either clamped to the tables along one edge thereof or simply layed flat on the table. However, due to the relatively wide spacing between the pins or blades, it is not possible to press the laser head downwardly against the stack because this could result in denting of the sheets. Similarly, honeycomb support tables, which are used primarily for foil sheets, are not strong enough to withstand the pressure of a laser head pressed against the stack. It has been found in accordance with this invention, however, that sheet separation on such support tables can be restrained by coating the sheets with a suitable viscous fluid so as to increase surface tension effects and thereby generate adhesive forces between adjacent sheets sufficient to resist the gas pressures which would otherwise cause separation of the sheets.

It has been found that between two and six sheets may be effectively cut using the method and apparatus of this invention. However, it is contemplated that more than six sheets could be cut. It has been further determined that the thickness of the stack that may be effectively cut varies inversely with the number of sheets in the stack. For example, two sheets of mild steel, stainless steel, alloy steel, aluminum, brass, or copper having a total thickness no greater than 0.375 inches may be effectively cut. With six sheets in the stack, the total thickness may not exceed 0.180 inches. Of course, the number of sheets and the total thickness will vary depending upon the particular material being cut, the power density, and other parameters.

The above and other objects, features, and advantages of the invention will become more apparent in view of the attached drawings, the following detailed description thereof, and the appended claims.

BRIEF DESCRIPTION OF THE DRAWINGS

FIG. 5 is a fragmentary perspective view of a pin-type support table.

FIG. 6 is a fragmentary perspective view of a blade-type support table.

FIG. 7 is a fragmentary perspective view of a honeycomb support table.

DESCRIPTION OF THE PREFERRED EMBODIMENTS

Figure 1:
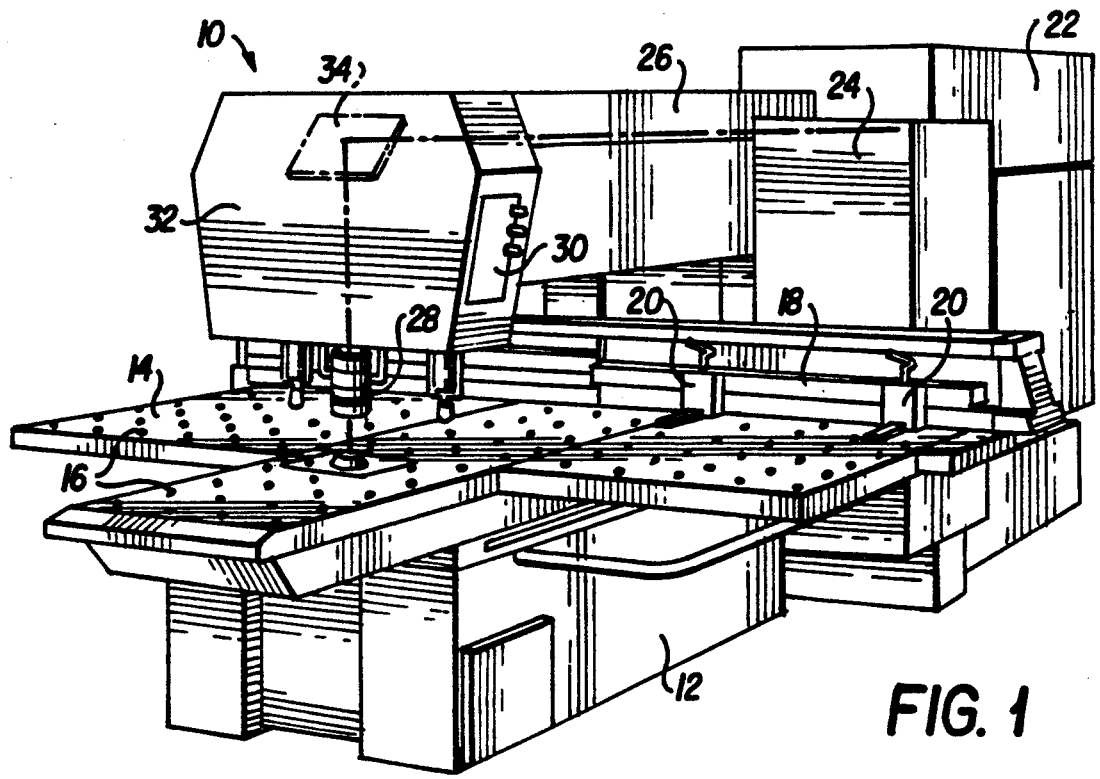
FIG. 1 is a perspective view of the laser cutting machine of this invention, and illustrates the laser cutting head disposed above a ball-transfer work table.

Referring now to the drawings in detail, there is illustrated in FIG. 1 the laser cutting machine of this invention generally designated by the numeral 10. The machine 10 includes a base 12 upon which is mounted a ball-transfer type work table 14. The work table 14 includes a plurality of roller balls 16 mounted therein in conventional manner which are adapted to support a worksheet (not shown). The machine 10 further includes a carriage 18 having a pair of hydraulically or pneumatically-actuated clamps 20 mounted thereon. The clamps 20 are adapted to grip a worksheet along one edge thereof and move it over the work table 14. The carriage 18 is movable by a conventional numeric control system along the Y axis of the machine, while the clamps 20 are movable with respect to the carriage 18 along the X axis of the machine.

The laser cutting machine 10 further includes a laser resonator 22, a computer numeric control (CNC) system 24, a cantilevered laser beam transfer housing 26, and a laser head 28 depending therefrom in fixed relation to the X and Y axes. The laser head 28 is, however, vertically movable along the Z axis toward and away from the work table 14 under automatic control of the CNC 24 or manually by controls 30 positioned on a laser head housing 32 disposed at the end of the laser beam transfer housing 26. The laser resonator 22 is preferably a $CO_2$ fast axial flow dual lane resonator having a power output of 1,000–2,500 watts with a wavelength of 10.6 microns-far infrared. The laser beam may be continuous or pulsed depending upon the worksheet material, its thickness, and other cutting parameters. The laser beam is tansmitted horizontally from the laser resonator 22 through the transfer housing 26 to a bending mirror 34 where it is reflected downwardly into the laser head 28. The laser head 28 includes a suitable lens 35 (FIG. 4) for focussing the laser beam B on the worksheet.

Figure 4:
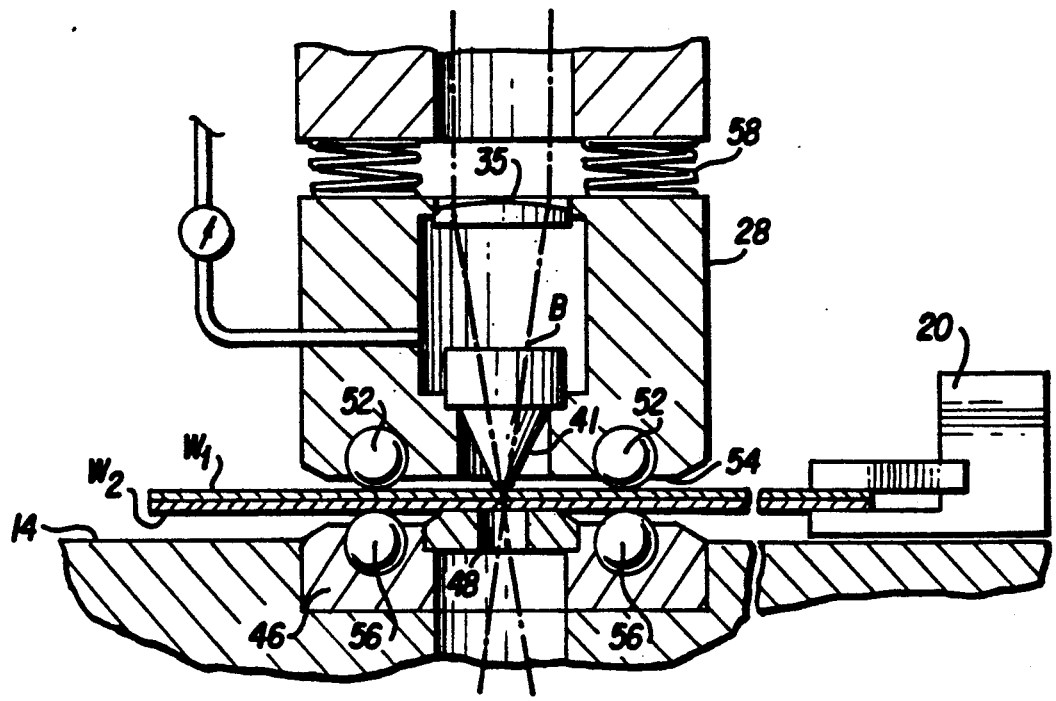
FIG. 4 is a fragmentary sectional view of the laser head of this invention, and illustrates two stacked worksheets clamped between the laser head and the support table.
Figure 2:
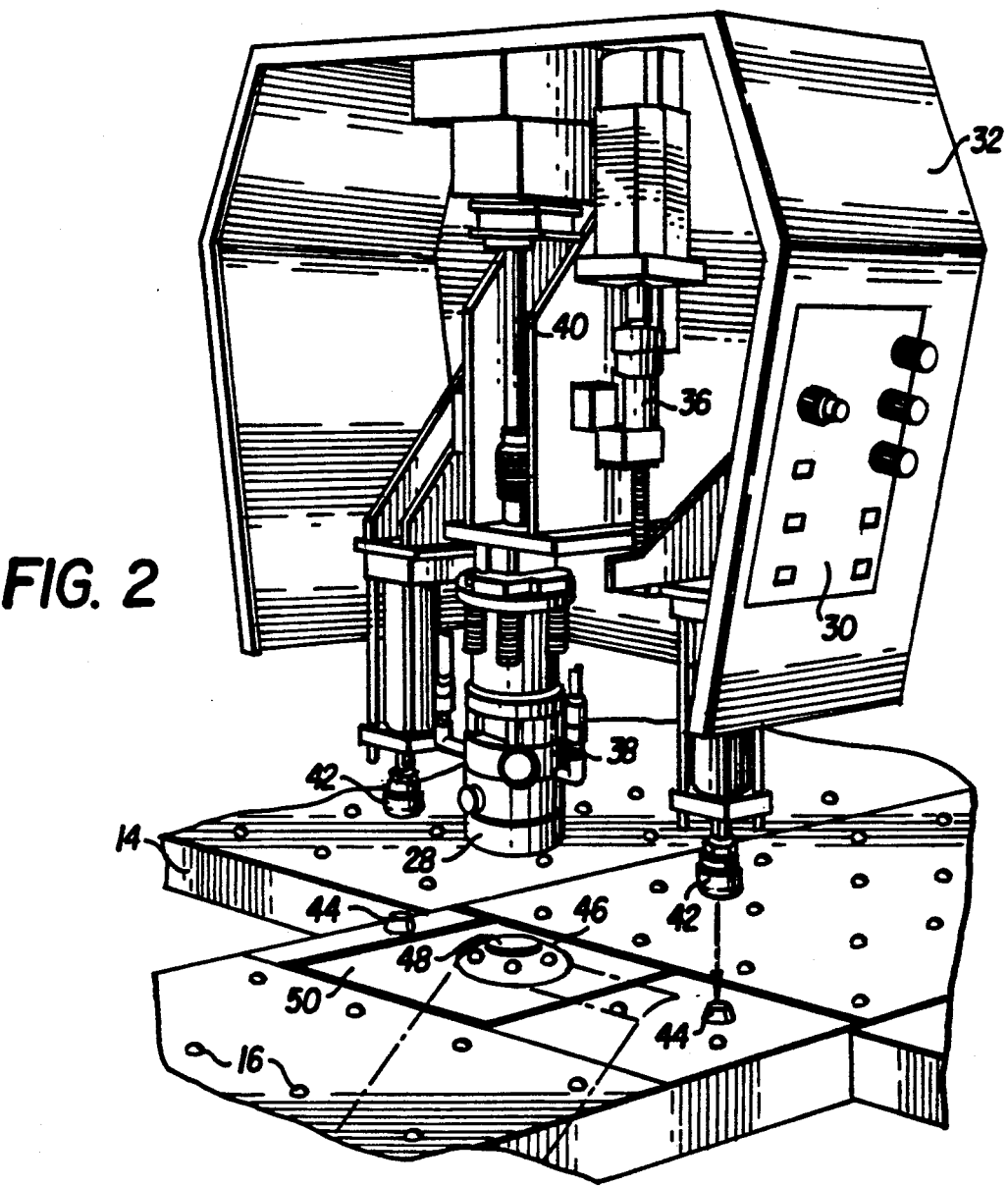
FIG. 2 is a fragmentary perspective view of the laser head of this invention, with a portion of the housing removed to illustrate details of construction of the head.

As seen most clearly in FIG. 2, the laser head 28 is suitably mounted within the housing 32 and adapted to be vertically moved along the Z axis by a hydraulic actuator 36 either manually or under control of the CNC 24. The laser head 28 also includes a focussing lens assembly 38 which includes the lens 35 (FIG. 4). A tubular conduit 40 extends from the bending mirror 34 to the laser head 28 for transmitting the laser beam to the lens assembly 38. Pressure assist cutting gases, such as oxygen or air, or inert gases such as nitrogen or helium, may be supplied coaxially to the laser beam through the conduit 40 and impinged on the worksheet at high pressure through a cutting nozzle 41 (FIG. 4) mounted in the laser head 28.

In order to maintain the worksheet (not shown) fixed while the position of the clamps 20 is adjusted relative thereto, the laser head housing 32 includes two pneumatically actuated grippers 42 which may be actuated to press downwardly against the worksheet and clamp it against raised protrusions 44 formed in the work table 14. After the clamps 20 have been repositioned along the edge of the worksheet, the grippers 42 are released so that the clamps 20 and carriage 18 may move the worksheet relative to the laser head 28.

As also seen in FIG. 2, the work table 14 includes a lower work support assembly 46 disposed beneath the laser head 28. The support assembly 46 includes an opening 48 which communicates with a suitable exhaust system (not shown) to remove gases and particulate matter generated during the cutting operation. The support assembly 46 is mounted on a chute or trap door 50 formed in the work table 14. The trap door 50 may be lowered in order to remove scrap and/or finished work from the surface of the work table 14.

Figure 3:
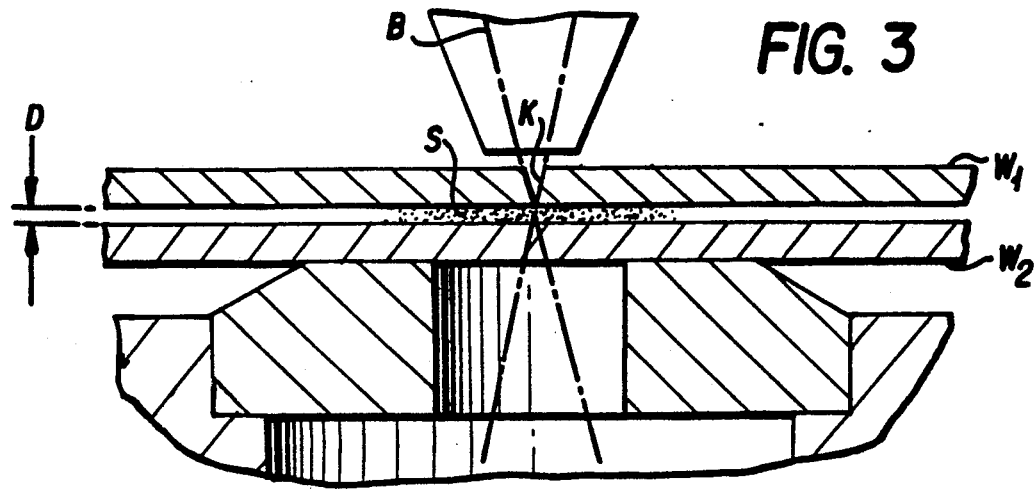
FIG. 3 is a fragmentary sectional view of two stacked worksheets being cut by a laser, and illustrates the sheets being separated under the pressure of the cutting gases.

Turning now to FIG. 3, it can be seen that if two worksheets $W_1$ and $W_2$ are stacked on a work table beneath a laser head, the pressure of the cutting assist gases will tend to cause the worksheets to separate by a distance D, thereby adversely affecting the cut in both the upper and lower sheets as discussed above. Slag S which is blown off the upper sheet $W_1$ will spread over the lower sheet $W_2$. In addition, the kerf K will be widened because the upper sheet $W_1$ has moved upwardly into the laser beam B. Moreover, due to the separation between the sheets, the beam B will tend to widen before impinging on the lower sheet $W_2$, thereby diminishing its power density. It has been determined in accordance with this invention, however, that such adverse consequences can be avoided by squeezing the sheets together as illustrated in FIG. 4. As seen in FIG. 4, the laser head 28 includes a series of roller balls 52 disposed in a circular pattern on its underside 54. The roller balls 52 are positioned in juxtaposed relation to a corresponding set of roller balls 56 disposed in the support assembly 46 beneath the worksheets $W_1$ and $W_2$.

In operation, the laser head 28 is pressed downwardly against the stacked worksheets $W_1$, $W_2$ by means of the CNC 24 or the manual controls 30 so that little or no "float" remains in the laser head 28. Although the laser head 28 includes a spring assembly 58 which provides sufficient resilience to allow the head to ride over gross irregularities in the surface of the worksheets, it is preferred that the "float" be no more than 0.25 inches. It has been found that under such circumstances the pressure of the laser head 28 is sufficient to maintain the worksheets $W_1$ and $W_2$ in close contacting relationship during the laser cutting operation so as to resist the pressure of the cutting assist gases from separating the worksheets. However, the pressure applied must not be too great or else it will impede movement of the stacked worksheets relative to the laser beam or mar the finish of the upper worksheet.

Referring now to FIGS. 5, 6 and 7, there is illustrated alternative types of work support tables upon which it is not practical to press the laser head 28 downwardly against the worksheets. FIG. 5 shows a pin-type work table including rails 62 upon which pins 64 are mounted. Because of the spacing between the pins 64, downward pressure of the laser head 28 against worksheets positioned thereon may dent the worksheets. The same problem exists with blade-type work tables. As illustrated in FIG. 6, a typical blade-type work table 66 includes spaced blades or rails 68 upon which the worksheets are supported.

FIG. 7 shows a honeycomb-type work support table designated generally by the numeral 70. Honeycomb support tables, which are intended to support foil sheets, are constructed of very thin material, typically 0.002–0.005 inches, and are themselves easily dented. Consequently, if it is desired to cut a stack of multiple foil sheets on a honeycomb support table, it is not practicable to maintain the sheets in close contacting relationship by pressing downwardly with the laser head.

Accordingly, it has been determined in accordance with this invention that in laser cutting of multiple stacked sheets on support tables as illustrated in FIGS. 5, 6 and 7, the stacked sheets may be maintained in close contacting relationship during the cutting process by first coating the sheets with a suitable viscous fluid, such as way oil or other types of light lubricating oil, to increase the surface tension effects and thereby generate adhesive forces between adjacent sheets sufficient to resist the gas pressure which would otherwise cause separation of the sheets during cutting.

It has been found that up to six stacked worksheets may be laser cut simultaneously using the method and apparatus of this invention; however, it is theoretically possible to cut more than six worksheets simultaneously. The total thickness of such a stack, however, should preferably not exceed 0.180 inches. If less than six sheets are cut simultaneously, the individual thickness of each sheet may be increased.

It should be apparent, therefore, that there has been provided in accordance with this invention a novel method and apparatus for simultaneous laser cutting of multiple stacked metal worksheets. Various metals, such as cold rolled steel, stainless steel, aluminum, copper, and titanium, may be effectively cut with a high-quality, weld-ready edge. The invention increases the efficiency and productivity of all laser cutting machines, including stand-alone machines as well as combination laser-punch machines.

Although only preferred embodiments of the invention have been specifically illustrated and described herein, it is to be understood that various other modifications could be made without departing from the spirit and scope of the invention.

We claim:

1. Apparatus for laser cutting of multiple stacked metal worksheets, comprising a work table, means for supporting the stacked worksheets on the work table, a laser head supported in juxtaposed relation to the work table, means for moving the stacked worksheets relative to said laser head, means for transmitting a focussed laser beam through said laser head for cutting the stacked worksheets, means for supplying cutting gases coaxial to said laser beam, and means for maintaining the stacked worksheets in close contacting relation to one another to prevent separation thereof by said gases during the cutting operation.

2. Apparatus according to claim 1, wherein said work table is a ball-transfer table, and said maintaining means includes means for squeezing the stacked worksheets between said laser head and said ball-transfer table.

3. Apparatus according to claim 2, wherein said squeezing means includes a set of roller balls mounted in the bottom of said laser head and arranged to confront a set of roller balls mounted in said work table.

4. Apparatus according to claim 1, wherein said work table is a pin table, and said maintaining means includes a viscous fluid interposed between adjacent worksheets to promote adhesion thereof.

5. Apparatus according to claim 1, wherein said work table is a blade table, and said maintaining means includes a viscous fluid interposed between adjacent worksheets to promote adhesion thereof.

6. Apparatus according to claim 1, wherein said work table is a honeycomb table, and said maintaining means includes a viscous fluid interposed between adjacent worksheets to promote adhesion thereof.

7. A method of laser cutting of multiple stacked metal worksheets, comprising the steps of:
 a) providing a work table;
 b) loading a plurality of metal worksheets on the work table in stacked relation to one another;
 c) generating a focussed laser beam;
 d) providing pressurized cutting gases coaxial to the laser beam;
 e) simultaneously cutting the stacked worksheets by moving them under the focussed laser beam; and
 f) maintaining the stacked worksheets in close contacting relation to one another to prevent separation thereof by said cutting gases during the cutting operation.

8. The method of claim 7, wherein the step of maintaining the stacked worksheets in close contacting relation is accomplished by resiliently squeezing them together.

9. The method of claim 7, wherein the step of maintaining the stacked worksheets in close contacting relation is accomplished by coating the worksheets with a viscous fluid to promote adhesion thereof.

10. Apparatus for laser cutting of multiple stacked metal worksheets, comprising a ball-transfer work table, means for supporting the stacked worksheets on said work table, a spring mounted laser head supported in juxtaposed relation to said work table, said laser head adapted to be axially movable along a vertical Z axis in response to irregularities in the surface of the worksheets by an amount no greater than 0.25 inches, means for moving the stacked worksheets relative to said leaser head, means for transmitting a focussed laser beam through said laser head for cutting the stacked worksheets, means for supplying cutting gases coaxial to said laser beam, and means for maintaining the stacked worksheets in close contacting relation to one another to prevent separation thereof by said gases during the cutting operation, said maintaining means includes means for squeezing the stacked worksheets between said laser head and said work table.

* * * * *